United States Patent [19]
Bloom

[11] Patent Number: 5,680,495
[45] Date of Patent: Oct. 21, 1997

[54] FIBER OPTIC DEVICE SEALED BY COMPRESSED METAL SEALS AND METHOD FOR MAKING THE SAME

[76] Inventor: Cary Bloom, 251 Blaze Climber Way, Rockville, Md. 20850

[21] Appl. No.: 679,059

[22] Filed: Jul. 12, 1996

[51] Int. Cl.⁶ .................... G02B 6/00; G02B 6/36
[52] U.S. Cl. .................................................. 385/94
[58] Field of Search ...................... 385/88–93, 147, 385/141, 77, 31, 37, 28, 8, 16, 10, 40, 123; 372/34, 39, 75, 106, 108; 257/94, 96, 97, 98; 437/127, 117, 129, 130, 111

[56] References Cited

U.S. PATENT DOCUMENTS

| | | | |
|---|---|---|---|
| Re. 33,296 | 8/1990 | Stowe et al. | 385/100 |
| 3,854,003 | 12/1974 | Duret | 385/27 |
| 4,026,632 | 5/1977 | Hill et al. | 385/88 |
| 4,534,099 | 8/1985 | Howe | 257/750 |
| 4,714,316 | 12/1987 | Moore et al. | 385/27 |
| 4,763,977 | 8/1988 | Kawasaki et al. | 385/27 |
| 4,772,085 | 9/1988 | Moore et al. | 385/96 |
| 4,779,945 | 10/1988 | Hill et al. | 385/27 |
| 4,781,425 | 11/1988 | Risk et al. | 385/1 |
| 4,799,438 | 1/1989 | Moore et al. | 385/27 |
| 4,834,481 | 5/1989 | Lawson et al. | 385/15 |
| 4,895,423 | 1/1990 | Bilodeau et al. | 385/96 |
| 4,900,119 | 2/1990 | Hill et al. | 385/27 |
| 4,906,068 | 3/1990 | Olson et al. | 385/16 |
| 4,923,273 | 5/1990 | Taylor | 385/15 |
| 4,957,338 | 9/1990 | Thorncraft et al. | 385/15 |
| 4,997,243 | 3/1991 | Aiki et al. | 385/88 |
| 4,997,245 | 3/1991 | DuPuy et al. | 385/16 |
| 4,997,247 | 3/1991 | Stowe | 385/93 |
| 4,997,248 | 3/1991 | Stowe | 385/37 |
| 4,997,252 | 3/1991 | Sugawara et al. | 385/88 |
| 4,997,253 | 3/1991 | Enochs | 385/88 |
| 5,013,117 | 5/1991 | Fukuma | 385/88 |
| 5,037,172 | 8/1991 | Hekman et al. | 385/31 |
| 5,121,453 | 6/1992 | Orazi et al. | 385/51 |
| 5,136,121 | 8/1992 | Kluska et al. | 174/93 |
| 5,157,751 | 10/1992 | Maas et al. | 385/99 |
| 5,166,992 | 11/1992 | Cassidy et al. | 385/24 |
| 5,166,994 | 11/1992 | Stowe et al. | 385/48 |
| 5,222,176 | 6/1993 | Webber et al. | 385/99 |
| 5,283,852 | 2/1994 | Gibler et al. | 385/136 |
| 5,293,440 | 3/1994 | Miles et al. | 385/51 |
| 5,343,544 | 8/1994 | Boyd et al. | 385/46 |
| 5,355,426 | 10/1994 | Daniel et al. | 385/39 |
| 5,367,591 | 11/1994 | Seike et al. | 385/51 |
| 5,386,484 | 1/1995 | Ooka et al. | 385/11 |
| 5,386,488 | 1/1995 | Oikawa | 385/92 |
| 5,386,490 | 1/1995 | Pan et al. | 385/134 |
| 5,395,101 | 3/1995 | Takimoto et al. | 269/289 |
| 5,445,319 | 8/1995 | Pan et al. | 385/96 |
| 5,475,780 | 12/1995 | Mizrahi | 385/37 |
| 5,475,784 | 12/1995 | Bookbinder et al. | 385/94 |
| 5,491,762 | 2/1996 | Deacon et al. | 385/37 |
| 5,502,316 | 3/1996 | Kish et al. | 257/94 |
| 5,504,772 | 4/1996 | Deacon et al. | 385/37 |
| 5,544,268 | 8/1996 | Bischel et al. | 385/16 |
| 5,586,206 | 12/1996 | Brinkman et al. | 385/37 |

FOREIGN PATENT DOCUMENTS

| | | |
|---|---|---|
| 0 293 289 | 11/1988 | European Pat. Off. . |
| 87/00934 | 2/1987 | WIPO . |

*Primary Examiner*—Akm E. Ullah
*Attorney, Agent, or Firm*—Lowe, Price, LeBlanc & Becker

[57] ABSTRACT

An arrangement (apparatus and method) for hermetically sealing a fiber optic device. The fiber optic device includes a device body such as an optical coupler or a multiplexer coupled to exposed regions of optical fibers. The fiber optic device is hermetically sealed by forming metal seals such as pure aluminum blocks on exposed regions of the optical fibers. The blocks are formed by injecting molten aluminum into molds, during which the molten aluminum bonds to the optical fiber chemically and forms a compression seal on the optical fibers during cooling. The metal seals are then used to define a boundary for substrate bodies used to enclose the fiber optic device, where a hermetic seal is formed between the metal seals and the substrates by compressing the substrates onto the metal seals. Hence, a hermetic seal may be easily implemented on an existing fiber optic device without the necessity of adhesives.

36 Claims, 4 Drawing Sheets

Figure 8A
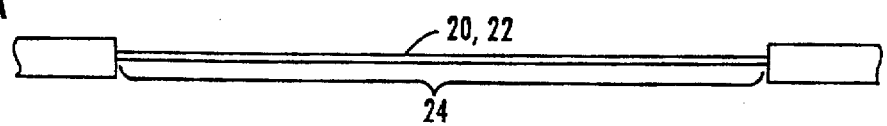
Figure 8B
Figure 8C
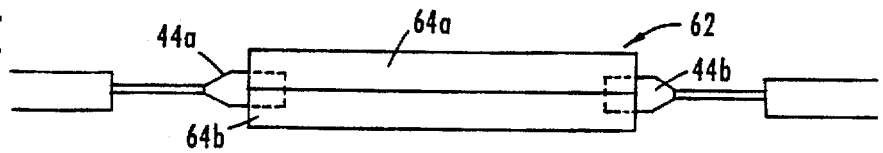
Figure 8D
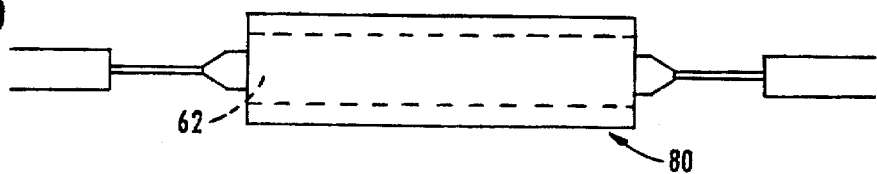
Figure 8E
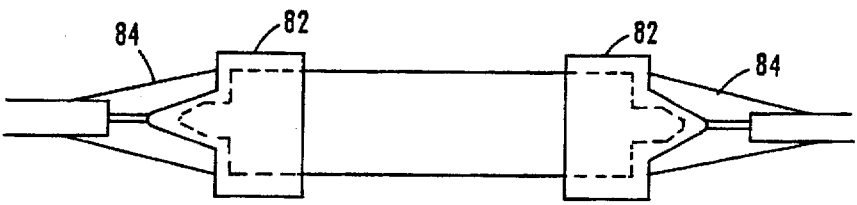
Figure 8F
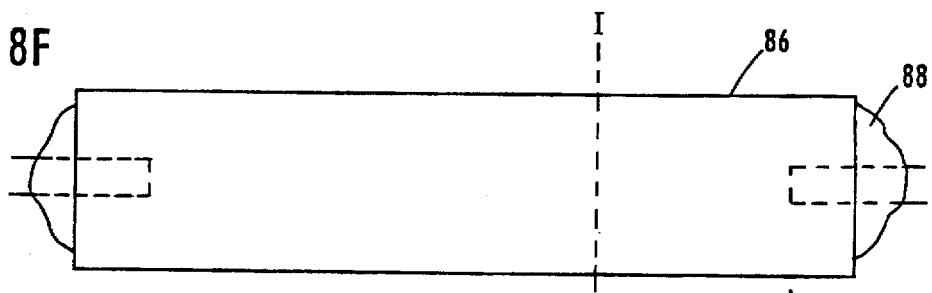
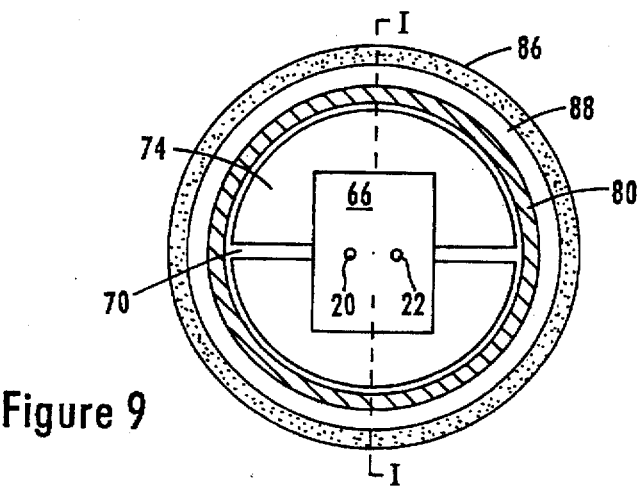
Figure 9

FIBER OPTIC DEVICE SEALED BY COMPRESSED METAL SEALS AND METHOD FOR MAKING THE SAME

TECHNICAL FIELD

The present invention relates to sealed fiber optic devices, specifically fiber optic devices encapsulated by metal.

BACKGROUND ART

Fiber optic devices are hermetically sealed to protect them from detrimental environmental conditions. Environmental influences may cause physical, chemical, or optic damage to an optical component. For example, an optical fiber coupler including optical fibers may be fastened to a glass substrate by an adhesive, for example a light-curable acrylic. If exposed to the environment, the adhesive can absorb moisture from the atmosphere and change dimensions and rigidity, lowering the precision alignment of the optical fiber coupler and increasing signal loss. Environmental influences may also change the optical characteristics of the fiber optic device, causing a degradation in the performance of the fiber optic device.

One technique of sealing a fiber optic device includes positioning the fiber optic device within a quartz body, and bonding the optical fiber to the quartz body with a UV light-curable epoxy adhesive. The adhesive is then cured by emitting ultraviolet (UV) light onto the adhesive. Outer protective bodies are then assembled surrounding the quartz body and the bonded fiber. The use of such epoxy, however, is still susceptible to moisture and chemicals. Hence, the epoxy may still break down upon exposure to moisture. Moreover, epoxy does not form a good bond with the optical fiber, and has relatively poor thermal characteristics, resulting in expansion or contraction due to changes in temperature.

Another proposed technique uses optical fibers having a metal coating instead of the conventional plastic coating. The proposed method removes the metal coating layer from the metal-coated optical fibers, fuses together the exposed portions of the optical fibers, and immediately after fusing, forms a metal reinforcing layer on the coupled portion of the optical fibers under an anhydrous atmosphere. The metal reinforcing layer is formed by applying a primary layer of metal on the exposed portion of the fibers by sputtering or vacuum vapor deposition in a reaction container having an inert gas. A secondary layer of metal is then applied over the primary layer for mechanical strength. Such a technique, however, is cumbersome because it requires sputtering or vapor deposition equipment. Alternative techniques include encapsulating optical fibers and the corresponding fiber coating in molten metal having a low melting point. The low melting point is necessary to prevent damage to organic material within the optical fiber assembly, for example glass or adhesive. Moreover, such techniques are difficult to control, especially since components less dense than the molten material may tend to float to the top of a mold and move off-center within the mold.

DISCLOSURE OF THE INVENTION

There is a need for an arrangement (apparatus and method) for hermetically sealing a fiber optic device without the necessity of adhesives that are subject to degradation upon exposure to air or moisture.

There is also a need for attaching a fiber to a substrate in a reliable and controllable manner.

There is also a need for an arrangement for hermetically sealing a fiber optic device using metal bonded directly to the optical fiber to hermetically seal the fiber optic device.

There is also a need for an arrangement for forming a compressive and chemical seal in an efficient manner to hermetically seal a fiber optic device.

There is also a need for an arrangement for encapsulating and hermetically sealing a previously-manufactured fiber optic device during a retrofit operation.

These and other needs are attained by the present invention, where metal seals that form a chemical and compressive seal with the optical fiber are used to hermetically seal the fiber optic device within a sealed enclosure.

According to one aspect of the present invention, an apparatus includes a fiber optic device comprising at least one optical fiber having an exposed region, and a device body coupled to the optical fiber at the exposed region. The apparatus also includes first and second metal seals bonding with and surrounding the optical fiber at respective first and second locations of the exposed regions, and a first enclosure sealing the fiber optic device between the first and second metal seals. The first enclosure includes a first substrate having a middle inner surface and end surfaces, the end surfaces contacting first surfaces of the first and second metal seals, respectively, and a second substrate having a middle inner surface contacting the corresponding middle inner surface of the first substrate and end surfaces contacting second surfaces of the first and second metal seals, respectively, the middle and end surfaces of the first and second substrates each comprising a first deformable metal layer sealing the corresponding surfaces in response to compression of the first and second substrates. The use of a deformable metal layer on each surface contacting a corresponding surface ensures that a hermetic seal is formed within the enclosure by compressing the surfaces and the first and second metal seals together. Hence, a hermetic seal is formed around the fiber optic device without the need for adhesives that may degrade due to exposure to air or moisture.

Another aspect of the present invention provides a method of hermetically sealing a fiber optic device, where the fiber optic device is coupled to at least one optical fiber at an exposed portion. The method comprises the steps of molding first and second metal blocks at first and second locations on the exposed portion of the optical fiber, where the first and second locations are positioned at each end of the fiber optic device. The fiber optic device is then sealed by positioning at least a portion of the first and second metal blocks and the fiber optic device within first and second substrates, and compressing the first and second substrates onto the first and second metal blocks. The first and second substrates have respective first and second deformable metal layers each contacting the first and second metal block portions, and the first deformable metal layer contacts the second deformable metal layer at complementary regions. Hence, the fiber optic device can be hermetically sealed without the use of adhesives.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 8A–8F are diagrams illustrating the sequence of hermetically sealing the fiber optic device according to an embodiment of the present invention.

FIG. 9 is a cross-section of the apparatus sealing the fiber optic device according to an embodiment of the present invention.

BEST MODE FOR CARRYING OUT THE INVENTION

The present invention provides an arrangement (apparatus and method) for hermetically sealing a fiber optic device having optical fibers with exposed regions, and a device body coupled to the optical fibers within the exposed regions. The fiber optic device may be an optical fiber coupler or a multiplexer. As described below, the disclosed embodiment hermetically seals the fiber optic device by forming metal seals on exposed regions of the optical fibers. The metal seals bond to the optical fiber chemically and form a compression seal on the optical fibers to ensure a hermetic seal. The metal seals are then used to define a boundary for substrate bodies used to enclose the fiber optic device, where a hermetic seal is formed between the metal seals and the substrates by compressing the substrates onto the metal seals. Hence, a hermetic seal may be easily implemented, without the necessity of adhesives.

Figure 1:
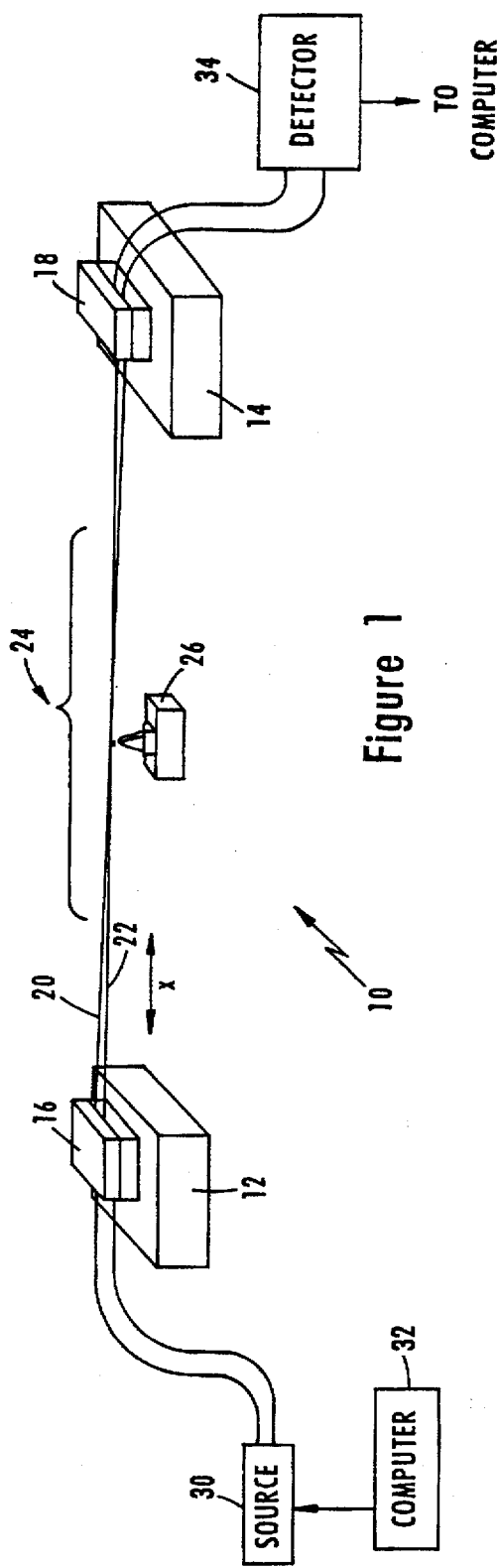
FIG. 1 is a diagram illustrating an apparatus forming a fiber optic coupler.

FIG. 1 is a diagram illustrating an apparatus for forming a fiber optic device such as a fiber optic coupler. The apparatus 10 includes a first movable stage 12 and a second movable stage 14 that are independently movable along an axis X. The stages 12 and 14 each include clamps 16 and 18 that are used to secure optical fibers 20 and 22 to the stages 12 and 14. After the optical fibers 20 and 22 are secured to the stages by the clamps 16 and 18, the stages 12 and 14 are moved to add tension to the fibers during formation of the optical coupler.

The optical fibers 20 and 22 each include an exposed region 24, where the optical fibers are stripped of the plastic sheath to expose the cladding. After the cladding of the optical fibers are exposed in region 24, shown for example in FIG. 8A, a heating device 26 such as a burner applies heat to the exposed optical fiber. The optical fibers 20 and 22 are fused at the heated area within the exposed region 24 to form a fiber optic device 36 having exposed optical fibers 20 and 22 at region 24 and a device body 28 (see FIG. 2).

As shown in FIG. 1, the apparatus 10 may also include a light source controlled by a computer 32 that monitors the output of the optical fibers 20 and 22 based on the outputs detected by the detector 34.

Figure 2:
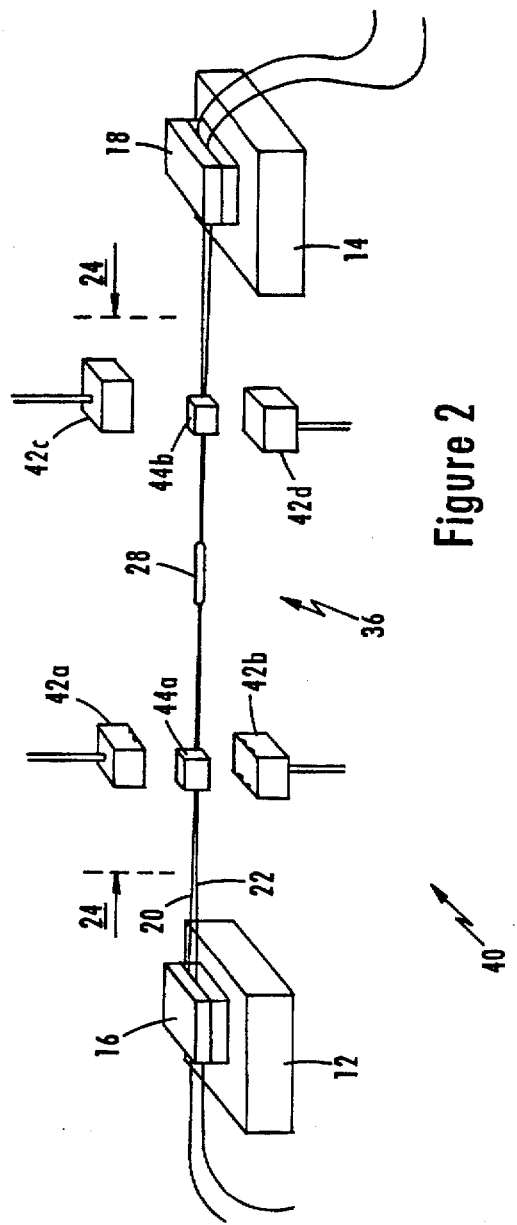
FIG. 2 is a diagram of an apparatus for hermetically sealing a fiber optic coupler according to an embodiment of the present invention.

FIG. 2 is a diagram illustrating an apparatus 40 for hermetically sealing the fiber optic device 36. The fiber optic device 36 includes optical fibers 20 and 22, each having an exposed region 24, and a device body 28, for example a fiber optic coupler, that is coupled to the optical fibers within the exposed region 24. Although two optical fibers are shown in FIG. 2, a single optical fiber may be coupled to the fiber optic device 36, for example, if the fiber optic device 36 is an attenuator.

The method of hermetically sealing the fiber optic device 36 preferably is initiated immediately after formation of the device body 28, although the disclosed method is applicable to pre-existing fiber optic devices that are mounted on the apparatus 40 and have the optical fibers 20 and 22 stripped to expose the optical fibers in the region 24. According to the disclosed embodiment, the exposed region 24 has a length of approximately 40 to 66 millimeters.

As shown in FIG. 2, the apparatus 40 includes mold portions 42 that are positioned at first and second locations of the exposed region 24 to form metal blocks 44. Specifically, the molds 42a and 42b are complementary molds that are moved to enclose the optical fibers 20 and 22. As described below, the molds 42a and 42b are used to form the metal block 44a. Similarly, the molds 42c and 42d are moved together to enclose the fibers 20 and 22, in order to form the metal block 44b. Although not shown in FIG. 2, additional components may be pre-threaded onto the optical fibers 20 and 22 between the mounts 16 and 18. Alternatively, one of the mounts may be temporarily opened to add components threaded on the fiber, described below.

Figure 3A:
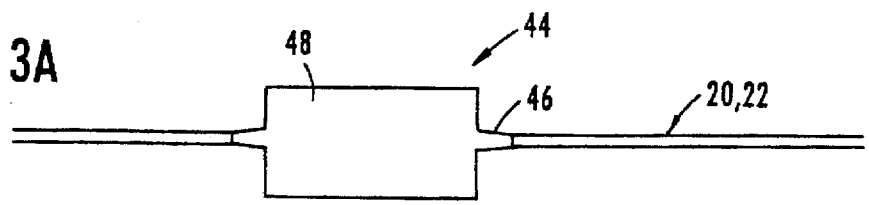
FIGS. 3A and 3B are diagrams illustrating side and top views of the metal blocks of FIG. 2.
Figure 3B:
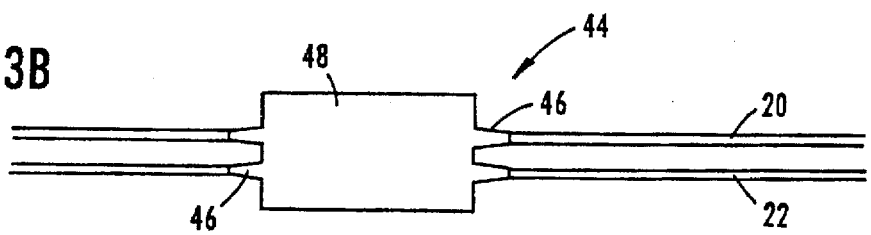

FIGS. 3A and 3B are side and top views of the metal blocks 44 of FIG. 2, respectively. The metal block 44, also referred to as a metal seal, includes metal extensions 46 that provide strain relief for the optical fibers and a cubic portion 48 that serves as a support structure for enclosures to be added to the assembly, described below. The extensions 46 thus provide structural strength preventing the optical fibers 20 and 22 from bending on an edge. Although disclosed as a cubic structure, the portion 48 of the metal block 44 may have other shapes.

Figure 4A:
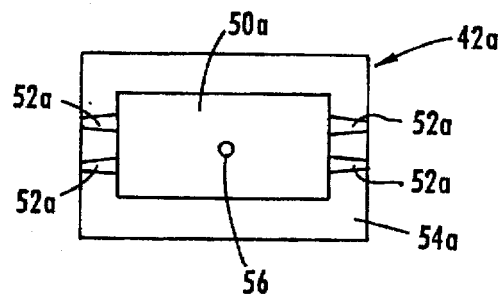
FIGS. 4A and 4B are diagrams illustrating top views of the molds used to form the metal blocks of FIG. 2.
Figure 4B:
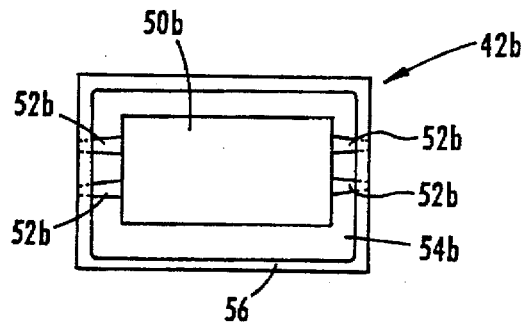

FIGS. 4A and 4B are diagrams illustrating the inner views of the molds 42a and 42b, respectively. As shown in FIG. 4A, the mold 42a includes a cavity 50 used to form the portion 48 of the metal seal 44. The mold 42a also includes notches 52 that are used to form the extensions 46. The mold 42a also includes a surface 54a that comes into contact with the corresponding surface 54b of the complementary mold 42b, and an aperture 56 for evacuating atmosphere and injecting inert gas and molten metal. The complementary mold 42b includes a corresponding cavity 50b complementary to the cavity 50a to form the cube portion 48, and portions 52b complementary to the portions 52a that form the extensions 46. The mold 42b also includes on the surface 54b a mold seal 56 surrounding the outer edge of the surface 54b. The mold seal, preferably a high-temperature polymer seal, forms a tight seal with the mold portion 42a to ensure an airtight fit between the molds 42a and 42b during enclosure of the fibers 20 and 22. Hence, the aperture portions 52a and 52b enclose the optical fibers 20 and 22 to for a tight fit, preventing any leakage of molten metal or any gas.

Figure 5:
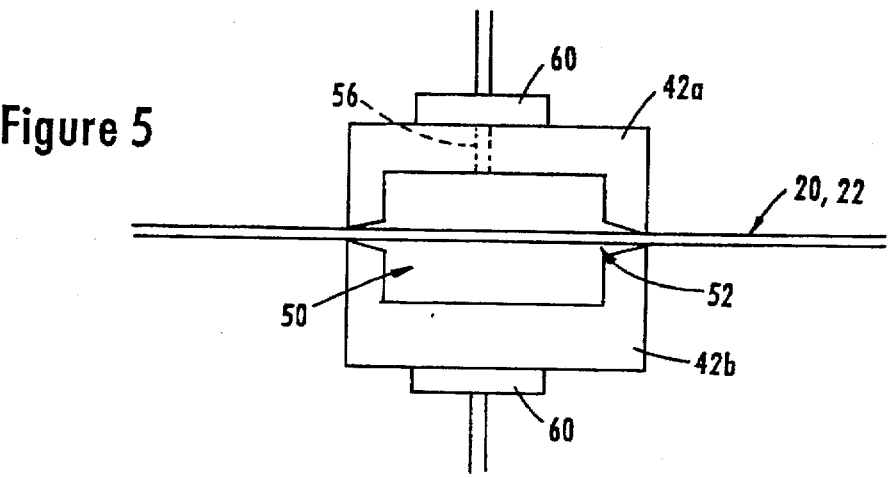
FIG. 5 is a diagram illustrating formation of the metal blocks of FIG. 2.

FIG. 5 is a diagram illustrating operation of the molds 42 to form the metal seal 44 on the optical fibers. As shown in FIG. 5, the molds 42a and 42b are moved together to enclose the optical fibers 20 and 22 to form an airtight region for forming the metal seal 44. The region includes the cavity 50 and the region 52. After the molds 42a and 42b are secured around the optical fibers 20 and 22, the atmosphere is evacuated from the cavity 50 via the aperture 54. As recognized in the art, the overall procedure of forming the fiber optic device 36 and hermetically sealing the fiber optic device is performed in an oxygen-free atmosphere.

After the oxygen-free atmosphere has been evacuated from the chamber 50, an inert gas, for example argon, helium or nitrogen is flooded into the cavity 50 at a positive pressure relative to the atmosphere via aperture 54. After the region 50 has been flooded with the inert gas, a vacuum is generated in the cavity 50 by evacuating the inert gas. Once a sufficient vacuum has been formed in the cavity 50, molten metal is injected into the cavity 50 at a temperature slightly above the melting point of the molten metal. According to the disclosed embodiment, the molten metal consists essentially of oxygen-free, pure liquid aluminum. Hence, the pure liquid aluminum is injected into the cavity 50 via aperture 54 at a temperature slightly above the melting point of pure aluminum, for example 700° C.

According to the disclosed embodiment, aluminum has a relatively high melting point, and will bond to the optical fibers 20 and 22. Specifically, the exposed optical fibers 20 and 22 consist essentially of fused silica, also referred to as fused quartz. Hence, the pure liquid aluminum injected at slightly above 660° C. will bond to oxygen molecules within the optical fibers 20 and 22 without devitrifying the optical fibers (i.e., breaking down the glass state). The molds 42 include an ultrasonic transducer 60 that applies ultrasonic energy to the molds 42. The ultrasonic transducers 60 reduce the surface energy of the liquid aluminum, reducing the surface tension so that the aluminum wets better to the optical fibers 20 and 22. The molds 42 are formed of ceramic to ensure that the aluminum does not easily wet to the molds 42. In addition, the ceramic material has appropriate thermal characteristics to cool the liquid aluminum to a solid state after a few seconds after injection. After sufficient cooling of the aluminum into a solid state, the molds 42a and 42b may be retracted from the optical fibers 20 and 22, resulting in completed formation of the metal blocks 44 as shown in FIG. 2 and FIG. 8B. If desired, the ultrasonic transducers 60 may be operated continuously throughout the injection process to ensure the aluminum does not wet to the molds.

A particular advantage of the disclosed embodiment is that the liquid aluminum chemically bonds with the fibers 20 and 22 to form a gas-tight seal. In addition, the aluminum liquid tends to compress during cooling. Hence, the cooled aluminum block 44 forms a hermetic seal with the enclosed optical fibers by forming a chemical bond with the optical fibers and by exerting compressive forces on the fibers. Hence, the present invention provides the advantage over aluminum-coated optical fibers, referred to as "hermetic fibers", in that hermetic fibers are susceptible to melting of the aluminum coating during heating to form the coupler. In addition, the variation of pull distance on the hermetic fibers will cause problems during package formation.

In the disclosed embodiment, however, adding the metal blocks 44 after formation of the coupler 28 provides a fixed frame of reference with respect to the coupler 28, and avoids any problems associated with formation of the coupler 28 by heating.

After formation of the metal blocks 44, the assembly including the optical fibers 20 and 22, the coupler 28, and the metal blocks 44 are enclosed within quartz enclosures while secured to the mounts 16 and 18. If necessary, however, the assembly may be moved as desired while maintaining a fixed frame of reference with respect to the coupler 28. Hence, the fiber optic device 36 may be moved for manufacturing or testing purposes without adversely affecting the precise alignment requirements associated with fiber optic assembly. The blocks 44 may then be used to secure the assembly to another mounting assembly for completing the sealing process, described below.

The fiber optic device 36 is hermetically sealed by enclosing the fiber optic device 36 and at least portions of the metal seals 44a and 44b within an enclosure 62, shown in FIG. 8C. The enclosure 62 includes a first substrate 64a and second substrate 64b that are formed on the metal seals 44a in an oxygen-free atmosphere. According to the disclosed embodiment, the enclosure 62 is formed in an inert atmosphere, such as nitrogen, helium or argon. The inert atmosphere is preferably at a predetermined pressure greater than ambient air pressure. Hence, formation of the enclosure 62 in the specified atmosphere ensures that the completed enclosure 62 hermetically seals the optical assembly in a positive-pressure inert atmosphere.

Figure 6:
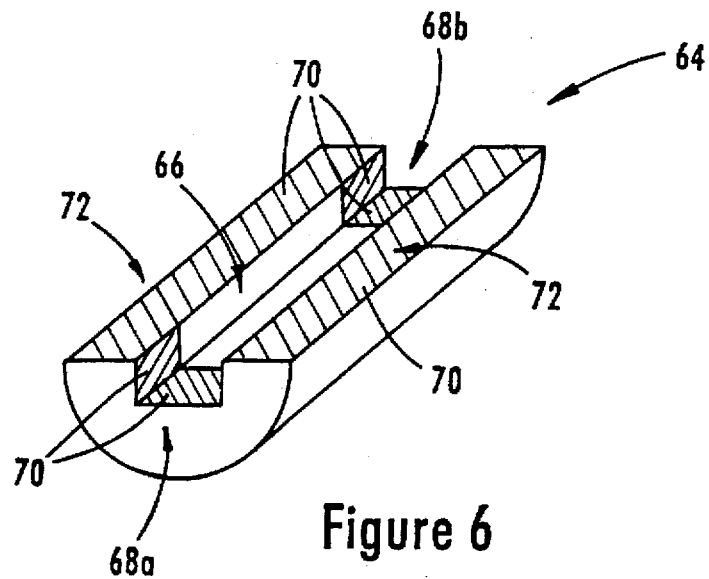
FIG. 6 is a perspective view of a substrate used to form the hermetic enclosure according to the embodiment of the present invention.
Figure 7:
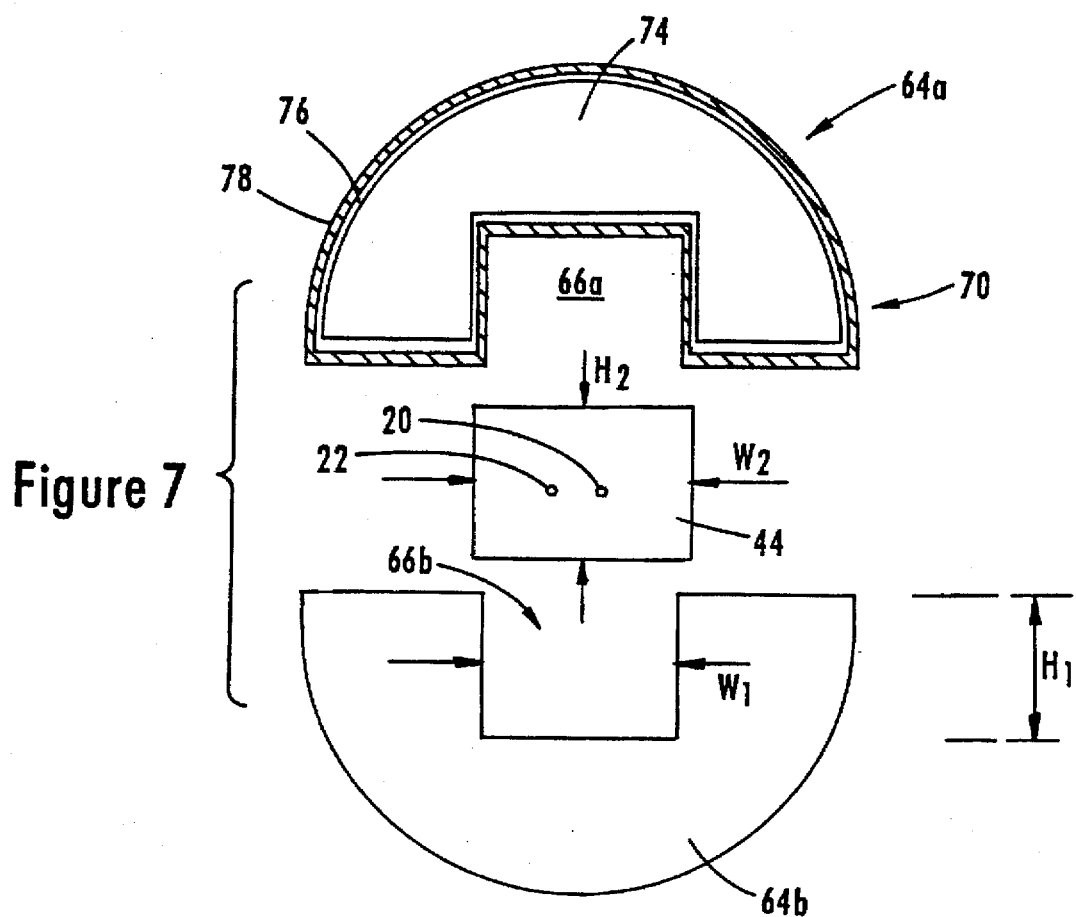
FIG. 7 is a diagram illustrating an upper and lower substrate forming a seal with a metal block according to an embodiment of the present invention.

FIG. 6 is a perspective view of the substrate 64. As shown in FIG. 6, the substrate 64 includes a trough extending axially along the substrate 64. The trough 66 is designed to accommodate the optical fibers 20 and 22 and the device body 28. The substrate 64 has end regions 68 adapted to engage one of the metal seals 44. For example, the end 68a engages the bottom surface of the metal seal 44a, and the end 68b engages the bottom surface of the metal seal 44b. The substrate 64a includes similar ends that engage the upper surface of the metal seals 44, as shown in FIG. 7. Each substrate 64a and 64b includes a deformable metal layer used to seal the substrate 64 with the corresponding contacting surface. For example, FIG. 6 illustrates that each end 68 includes a deformable metal layer 70. In addition, the middle surfaces 72 of the substrate 64 also include the deformable metal layer 70.

FIG. 7 is a cross-sectional diagram of an end of the substrate 64 in relationship to a metal seal 44 that encloses the optical fibers 20 and 22. The substrate 64a includes a body 74 and a deformable metal layer 70 overlying the body 74. According to the disclosed embodiment, the body 74 consists essentially of fused silica, and the deformable metal layer 70 comprises a first layer 76 and a second layer 78. Although not shown in FIG. 7, the substrate 64b also includes the body 74 and the deformable metal layer 70 composed of first metal layer 76 and second metal layer 78. According to the disclosed embodiment, the first metal layer 76 consists essentially of pure aluminum, and the second metal layer 78 consists essentially of gold. If desired, however, the second metal layer 78 can be eliminated such that the deformable metal layer 70 is formed only of the first aluminum layer 76.

As shown in FIG. 7, the substrates 64a and 64b each have a trough 66 having a width $W_1$ that is less than the width $W_2$ of the metal seal 44. Each of the substrates 64 also have a height $H_1$ that is less than one-half the height of the metal block 44, $H_2$. Hence, the dimensions of the troughs 66a and 66b require the interface metal layer 70 to deform in order to accommodate the metal seal 44. Hence, the metal layers 70 within the trough 66 at the end regions is deformed as the metal seal 44 is pressed into the trough 66 during the compression of the substrates 64a and 64b onto the metal block 44. Hence, the compression of the substrates 64a and 64b onto the metal seal 44 causes the metal seal 44 to be securely fitted into the trough 66, creating a hermetic seal by the displacement of the deformable metal layer 70 around the block 44. In addition, the metal block 44 may also be partially deformed during the compression process. Finally, compression of the substrates 64a and 64b causes the compression of the metal layers 70 at the complementary middle regions 72, creating a hermetic seal between the substrates 64a and 64b along the middle surface 72.

After the substrates 64a and 64b have been compressed onto the metal seal 44, the compressed substrates 64 and the metal blocks 44 form an enclosure 62, shown in FIG. 8C, having a hermetic seal around the optical body 28. If desired, ultrasonic welding may also be performed to weld the contacting metal layers.

After formation of the enclosure 62, a tubing 80 is threaded over the enclosure 62, shown in FIG. 8D. The tubing 80, formed of fused silica, includes a deformable metal interface layer such as the aluminum/gold interface layer 70 as described above, on the inner surface of the tube. The tube 80 has an inner diameter which is slightly less than the outer diameter of the enclosure 62. Hence, the deformable metal interface layer on the inner surface of the tubing 80 interacts with the deformable interface layer on the outer surface of the enclosure 62 to form a gas-tight enclosure exerting a compressive force on the enclosure 62. The gas-tight enclosure is formed by the displacement of the respective deformable metal layers. The tubing 80 exerts a compressive force to provide additional sealing between the tubing 80 and the substrates 64a and 64b of the enclosure 62, and to provide compressive force to maintain the hermetic seal between the substrates 64a and 64b and the metal blocks 44.

Ultrasonic welding may also be used to seal the contacting metal layers. If desired, two ultrasonic welding steps may be performed, first during formation of the enclosure 62, and after threading the tubing 80 over the enclosure 62. Alternatively, a single ultrasonic welding may be performed after the threading of the tubing 80 over the enclosure 62. Other types of welding may also be used to fuse the metal layers together.

After sealing the tubing 80 as shown in FIG. 8D, gold caps 82 are added onto each end of the tubing 80 to cover the ends of the tubing 80, and the ends of the metal seals 44. The caps 82 shown in FIG. 8E consist essentially of gold. The caps 82 may be prethreaded on the optical fibers 20 and 22, or may be attached by crimping a sheet of gold metal at each end. As the gold caps 82 are compressed at each end of the tubing 80, the portions of the metal box 44 extending from the tubing 80 are partially deformed with the caps 82. After the gold caps 82 have been secured on the ends of the tubing 80, the exposed optical fibers are coated with a conventional sealing material 84, for example rubber.

After the exposed optical fibers have been covered by the sealant 84, a protective metal tubing 86, formed of a nickel-based alloy, for example Invar, is threaded over the assembly. If desired, a nonmetal tubing having relatively low thermal expansion coefficient may also be used. After loosely fitting the metal coating 86 over the assembly, the metal coating 86 is secured by injecting into the space between the covering 86 and the assembly a sealant, for example an RTV (room temperature vulcanizing) silicon coating 88. Once the RTV 88 has hardened, the completed assembly 100 shown in FIG. 8F may be packaged by coating the ends of the optical fibers as necessary.

Hence, the present invention provides an arrangement where a hermetic seal is formed by adding metal seals that form a chemical and compressive seal on the optical fibers. The metal seals also form a compressive seal between substrates, a deformable metal interface layer to form a hermetic seal. Hence, an optical fiber device may be hermetically sealed in an efficient manner without the necessity of adhesives such as UV-curable epoxy.

FIG. 9 is a cross-section of the apparatus sealing the fiber optic device along lines I—I of FIG. 8F. As shown in FIG. 9, the optical fibers 20, 22 are hermetically sealed in a gas-tight enclosure 66 formed by the troughs and enclosing an inert gas at a positive pressure relative to ambient air pressure. The enclosure 66 is bounded by the quartz bodies 74 and the deformable metal layer 70. The quartz tubing 80 provides additional compressive forces on the enclosure 62 to maintain the compressive seal. Hence, even though the RTV coating 88 may be susceptible to moisture, the compressive force exerted by the quartz tubing 80 on the quartz substrates 64a and 64b maintains the hermetic seal between the quartz substrates 64a and 64b, and the metal seals 44a and 44b.

Although the disclosed embodiment specifies a deformable metal interface layer having an aluminum layer overlying a fused silica body and a gold layer overlaying the aluminum, it will be appreciated that the disclosed embodiment may be modified by eliminating the gold metal layer, such that the deformable metal layer includes only the single aluminum layer. In such a variation, the contacting aluminum interface layers may be sealed together by combining the compressing steps with heating to soften the deformable metal layers before compression.

In addition, it will be appreciated that other metals may be used to form the metal seal, so long as the compressive seal is maintained. Hence, chemical bonding of the metal seal to the optical fiber is not necessary to maintain the hermetic seal.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus comprising:
    a fiber optic device comprising at least one optical fiber having an exposed region, and a device body coupled to the optical fiber at the exposed region;
    first and second metal seals bonding with and surrounding the optical fibers at respective first and second locations of the exposed region; and
    a first enclosure sealing the fiber optic device between the first and second metal seals, the first enclosure comprising:
    (1) a first substrate having a middle inner surface and end surfaces, the end surfaces contacting first surfaces of the first and second metal seals, respectively, and
    (2) a second substrate having a middle inner surface contacting the corresponding middle inner surface of the first substrate and end surfaces contacting second surfaces of the first and second metal seals, respectively, the middle and end surfaces of the first and second substrates each comprising a first deformable metal layer sealing the corresponding surfaces in response to compression of said first and second substrates.

2. The apparatus of claim 1, further comprising a tubing surrounding the first enclosure and compressing the first and second substrates.

3. The apparatus of claim 2, wherein the enclosure includes an outer surface having a second deformable metal layer and the tubing comprises an inner surface having a third deformable metal layer, the second and third metal layers forming a compressive seal.

4. The apparatus of claim 3, wherein the first and second seals each have a portion extending beyond the first enclosure and the tubing.

5. The apparatus of claim 4, further comprising a first deformable cap covering the portion of the first seal and a first end of the tubing, and a second deformable cap covering the portion of the second seal and a second end of the tubing.

6. The apparatus of claim 5, further comprising a first and second coating covering a first and second portion of the exposed regions and a portion of the first and second caps, respectively.

7. The apparatus of claim 6, wherein the cap and the metal layers each consist essentially of gold.

8. The apparatus of claim 2, wherein the tubing and the metal seals consist essentially of pure aluminum, and the first and second metal seals are positioned at respective ends of the tubing.

9. The apparatus of claim 8, wherein the first deformable metal layer consists essentially of pure aluminum.

10. The apparatus of claim 1, wherein the first and second substrates comprise fused silica, and the first deformable surface layer comprises a first metal layer overlying the corresponding portion of the enclosure, and a second metal layer overlying the first metal layer.

11. The apparatus of claim 10, wherein the first metal layer consists essentially of pure aluminum and the second metal layer consists essentially of gold.

12. The apparatus of claim 1, wherein the first enclosure hermetically seals the fiber optic device region between the first and second metal seals.

13. The apparatus of claim 12, wherein the first enclosure encloses an inert gas at a predetermined pressure.

14. The apparatus of claim 13, wherein the inert gas is one of nitrogen, helium and argon.

15. The apparatus of claim 13, wherein the predetermined pressure is greater than ambient air pressure.

16. The apparatus of claim 1, wherein the first substrate comprises a trough accommodating the fiber optic device.

17. The apparatus of claim 1, wherein said first and second substrates each comprise fused silica.

18. The apparatus of claim 17, wherein the deformable metal layer comprises an inert metal layer.

19. The apparatus of claim 18, wherein the deformable metal layer comprises a first metal layer overlying the fused silica, the inert metal layer overlying the first metal layer and having a lower coefficient of expansion than the first metal layer.

20. The apparatus of claim 1, wherein the first and second metal seals form a chemical bond with the exposed optical fiber at the first and second locations, respectively.

21. A method of sealing a fiber optic device, the fiber optic device coupled to at least one optical fiber at an exposed portion, the method comprising:

molding first and second metal blocks at first and second locations at the exposed portion of the optical fiber, the first and second locations positioned at each end of the fiber optic device; and sealing the fiber optic device comprising:

(1) positioning at least a portion of the first and second metal blocks and the fiber optic device within first and second substrates, the first and second substrates having respective first and second deformable metal layers each contacting the first and second metal block portions, the first deformable metal layer contacting the second deformable metal layer at complementary regions, and (2) compressing the first and second substrates onto the first and second metal blocks.

22. The method of claim 21, wherein said molding step comprises:

enclosing the first and second locations of the exposed portion with first and second molds to form a molding cavity surrounding the exposed optical fibers;

injecting molten metal into the molding cavity; and removing the first and second molds after the molten metal has cooled to a solid state.

23. The method of claim 22, wherein said injecting step comprises:

first injecting an inert gas into the molding cavity;

evacuating gas from the molding cavity after said first injecting step; and adding said molten metal into the evacuated molding cavity.

24. The method of claim 22, wherein said injecting step further comprises applying ultrasonic energy to the first and second molds.

25. The method of claim 22, wherein the enclosing step comprises using ceramic molds as said first and second molds.

26. The method of claim 22, wherein the enclosing step comprises:

using ceramic molds as said first and second molds, the ceramic molds each having a high-temperature seal along the mold edges; and compressing the ceramic molds around the optical fibers to form an airtight seal within the molding cavity.

27. The method of claim 21, wherein the sealing step further comprises applying ultrasonic energy to the first and second substrates during said compressing step.

28. The method of claim 21, wherein the first and second metal blocks each have a first predetermined width and the first substrate comprises a trough having second predetermined width less than the first predetermined width, the compressing step comprising first displacing the first deformable metal layer to accommodate the first and second metal blocks within the trough.

29. The method of claim 28, wherein the second substrate comprises a trough having said second predetermined width, the compressing step further comprising second displacing the second deformable metal layer to accommodate the first and second metal blocks within the trough of said second substrate.

30. The method of claim 29, wherein said compressing step further comprises partially deforming the first and second metal blocks during said first and second displacing steps.

31. The method of claim 21, wherein the first and second substrates form an integrated enclosure having a predetermined outer diameter, said sealing step further comprising adding a sleeve over the integrated enclosure having a predetermined inner diameter less than the outer diameter of the integrated enclosure.

32. The method of claim 31, wherein the sealing step further comprises providing a third deformable metal layer between the integrated enclosure and the added sleeve.

33. The method of claim 32, wherein the first, second and third deformable metal layers comprise a gold layer.

34. The method of claim 31, wherein the sleeve includes fused silica.

35. The method of claim 21, wherein said molding step comprises injecting molten aluminum into molds positioned at said first and second locations to form said first and second metal blocks, respectively.

36. The method of claim 21, wherein the molding step comprises forming the metal blocks in an oxygen-free atmosphere.

* * * * *

UNITED STATES PATENT AND TRADEMARK OFFICE
CERTIFICATE OF CORRECTION

PATENT NO. : 5,680,495
DATED : October 21, 1997
INVENTOR(S) : Cary BLOOM

It is certified that error appears in the above-identified patent and that said Letters Patent is hereby corrected as shown below:

Column 1, line 11, delete the word "hermetically".

Signed and Sealed this

Twenty-fourth Day of February, 1998

Attest:

BRUCE LEHMAN

Attesting Officer

Commissioner of Patents and Trademarks